United States Patent
Lou et al.

(10) Patent No.: US 11,468,918 B1
(45) Date of Patent: Oct. 11, 2022

(54) DATA STORAGE DRIVE PRESSURE SENSING USING A HEAD TEMPERATURE SENSOR AND A HEAD HEATER

(71) Applicant: Seagate Technology LLC, Fremont, CA (US)

(72) Inventors: Huazhou Lou, Eden Prairie, MN (US); YiMin Niu, Eden Prairie, MN (US); Eric John McCalla, Big Lake, MN (US); Dipeshkumar J. Purani, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/322,266

(22) Filed: May 17, 2021

(51) Int. Cl.
G11B 33/14 (2006.01)
G11B 33/04 (2006.01)
G11B 23/02 (2006.01)

(52) U.S. Cl.
CPC ........ G11B 33/144 (2013.01); G11B 33/0466 (2013.01); G11B 23/021 (2013.01)

(58) Field of Classification Search
None
See application file for complete search history.

(56) References Cited

U.S. PATENT DOCUMENTS

| | | | |
|---|---|---|---|
| 6,314,814 B1 * | 11/2001 | Brannon | G11B 5/58 73/705 |
| 6,603,628 B1 | 8/2003 | Gillis et al. | |
| 7,434,987 B1 * | 10/2008 | Gustafson | G01M 3/3236 374/185 |
| 7,733,595 B2 | 6/2010 | Lucas et al. | |
| 8,687,307 B1 | 4/2014 | Patton, III | |
| 8,947,822 B1 | 2/2015 | Rice et al. | |
| 10,074,404 B2 | 9/2018 | Choe et al. | |
| 2007/0159710 A1 | 7/2007 | Lucas et al. | |
| 2007/0230017 A1 * | 10/2007 | Hiller | G11B 5/59627 360/75 |
| 2007/0297085 A1 * | 12/2007 | Zhang | G11B 5/6005 |
| 2008/0068742 A1 | 3/2008 | Kasajima | |
| 2008/0068755 A1 * | 3/2008 | Aoyagi | G11B 25/043 360/137 |
| 2008/0173089 A1 | 7/2008 | Wright et al. | |

(Continued)

FOREIGN PATENT DOCUMENTS

| | | | |
|---|---|---|---|
| CN | 1148569 C | 5/2004 | |
| EP | 1204117 A1 * | 5/2002 | G11B 19/04 |

(Continued)

*Primary Examiner* — William J Klimowicz
(74) *Attorney, Agent, or Firm* — Westman, Champlin & Koehler, P.A.

(57) ABSTRACT

A data storage drive includes a rotatable data storage medium, and a head communicatively couplable to the data storage medium. The head includes a temperature sensor and a heater. The data storage drive also includes a ramp for supporting the head when the head is moved away from the data storage medium, and a controller. The controller is configured to obtain first temperature sensor measurement values for different head heater power settings when the head is positioned on the ramp, and is configured to determine an internal pressure of the data storage drive as a function of the first temperature sensor measurement values.

20 Claims, 4 Drawing Sheets

(56) References Cited

U.S. PATENT DOCUMENTS

| | | | | |
|---|---|---|---|---|
| 2008/0186621 A1* | 8/2008 | Partee | ............... | G11B 5/6064 360/97.12 |
| 2009/0141390 A1* | 6/2009 | Oyamada | ............... | G11B 5/455 360/97.12 |
| 2009/0296262 A1* | 12/2009 | Ikeda | ............... | G11B 5/6005 360/75 |
| 2009/0310247 A1* | 12/2009 | Suzuki | ............... | G11B 5/6064 360/75 |
| 2010/0079913 A1* | 4/2010 | Okamoto | ............... | G11B 5/6005 360/128 |
| 2021/0043230 A1* | 2/2021 | Fukuta | ............... | G11B 5/5582 |

FOREIGN PATENT DOCUMENTS

| | | |
|---|---|---|
| JP | 2002197850 A | 7/2002 |
| JP | 5015175 B2 | 8/2012 |

* cited by examiner

US 11,468,918 B1

DATA STORAGE DRIVE PRESSURE SENSING USING A HEAD TEMPERATURE SENSOR AND A HEAD HEATER

SUMMARY

In one embodiment, a data storage drive is provided. The data storage drive includes a rotatable data storage medium, and a head communicatively couplable to the data storage medium. The head includes a temperature sensor and a heater. The data storage drive also includes a ramp for supporting the head when the head is moved away from the data storage medium, and a controller. The controller is configured to obtain first temperature sensor measurement values for different head heater power settings when the data storage medium is rotating and the head is positioned on the ramp, and is configured to determine an internal pressure of the data storage drive as a function of the first temperature sensor measurement values.

In another embodiment, a method of measuring an internal pressure of a data storage drive is provided. The method includes positioning a head, which comprises a temperature sensor and a heater and that is communicatively couplable to a data storage medium, on a ramp. The head, the data storage medium and the ramp are part of the data storage drive. The method also includes obtaining first temperature sensor measurement values for different head heater power settings when the data storage medium is rotating and the head is positioned on the ramp. The method further includes determining the internal pressure of the data storage drive as a function of the first temperature sensor measurement values.

In yet another embodiment, a data storage drive is provided. The data storage drive includes a rotatable data storage medium, and a head communicatively couplable to the data storage medium. The head includes a temperature sensor and a heater. The data storage drive also includes a ramp for supporting the head when the head is moved away from the data storage medium, and a controller. The controller is configured to obtain first temperature sensor measurement values for different head heater power settings when the head is positioned on the ramp, and is configured to determine an internal pressure of the data storage drive as a function of the first temperature sensor measurement values.

This summary is not intended to describe each disclosed embodiment or every implementation of the data storage drive pressure sensing using a head temperature sensor and a head heater disclosed herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1:
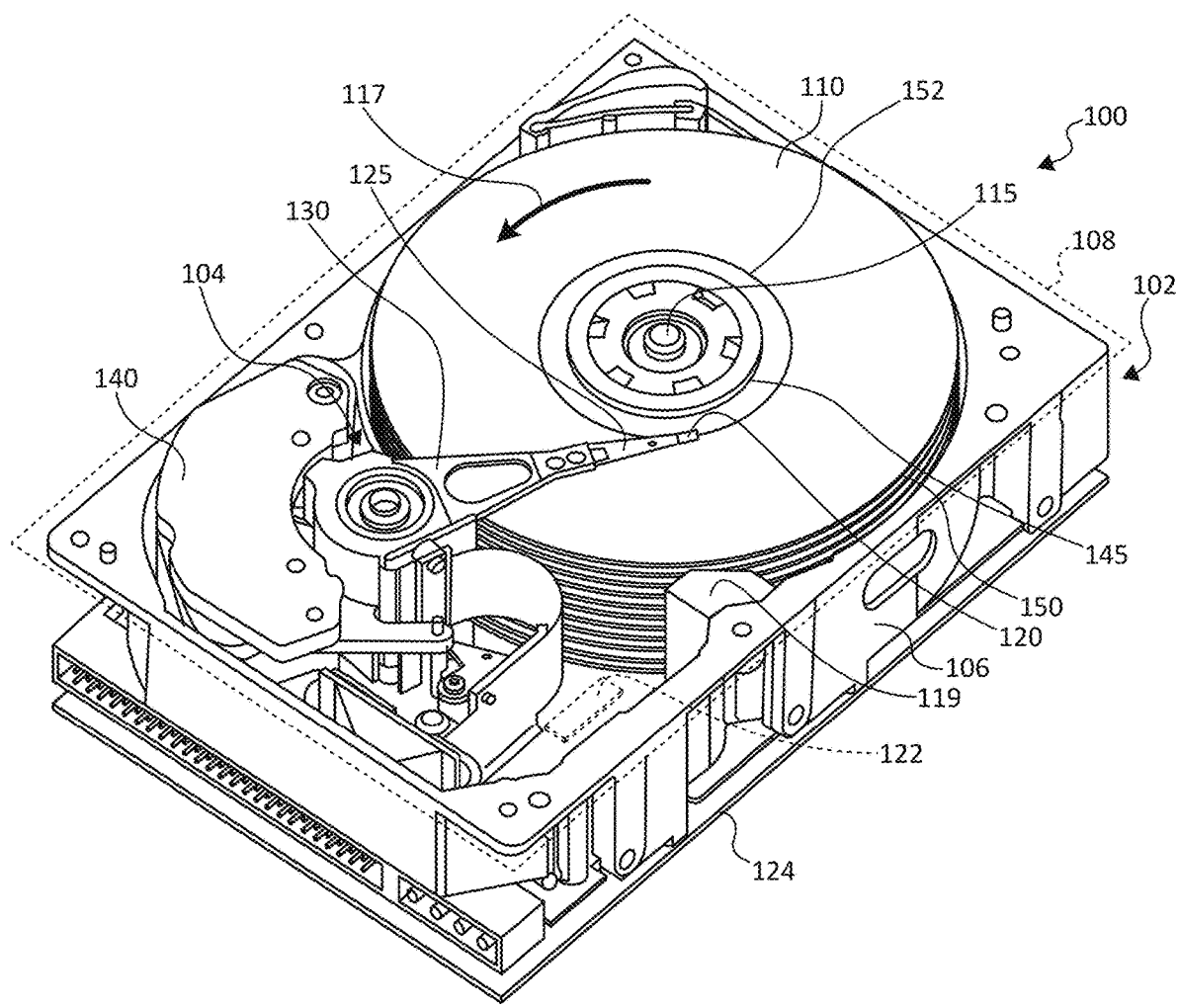
FIG. 1 is a perspective view of a data storage drive in accordance with one embodiment.

Embodiments of the disclosure relate to determining data storage device (e.g., hard disc drive (HDD), hybrid drive, etc.) internal pressure without using a dedicated physical pressure sensor.

Environmental control of air/gas inside a HDD is important from both reliability and performance standpoints. A decade or so ago, hermetically sealed HDD enclosures with helium gas inside became available, which substantially improved disc flutter and track-following stability. In some HDDs, a small amount of oxygen was added to the helium gas to reduce surface reactivities with stainless-steel parts inside the HDD. Pressure inside a hermetically sealed HDD affects non-repeatable runout, which is a track-following error that is not repeatable with each disc revolution, as well as head media clearance. As the head media active spacing approaches sub-nanometer levels, it is increasingly important to know HDD internal pressure. HDD internal pressure can be detected via a dedicated hard pressure sensor. However, this adds cost to the HDD.

Each head of an HDD is equipped with a differential ended temperature coefficient of resistance (DETCR) sensor and a heater. DETCR sensor temperature can be raised above ambient temperature by DETCR bias and heater power. The eventual DETCR temperature will also be affected by a cooling effect of gas pressure flow around the head.

When heads are parked on a ramp and discs are spinning, gas flow velocity at the head location changes with HDD internal pressure. This change in gas flow velocity together with the change of pressure affects cooling of the head, which can be measured by the DETCR sensor. Accordingly, as will be described in detail further below, in embodiments of the disclosure, the DETCR sensor and the heater inside the head are used to measure HDD internal pressure, thereby eliminating use of a dedicated hard pressure sensor. Prior to providing additional details regarding the different embodiments, a description of an illustrative operating environment is provided below.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a perspective view of a HDD 100 in accordance with one embodiment. While embodiments of this disclosure are described in terms of HDDs, other types of data storage drives (e.g., hybrid drives) should be considered within the scope of the present disclosure.

HDD 100 includes a housing 102 that hermetically seals or encloses an interior cavity 104 defined within the housing 102. The housing 102 includes a base 106 and a cover 108 (shown in hidden lines in FIG. 1 so as not to obscure internal features of the device 100 within the interior cavity 104 of the housing 102). The cover 108 is coupled to the base 106 to enclose and seal the interior cavity 104 from the environment exterior to the housing 102. In some implementations, a seal or gasket is positioned between the base 106 and the cover 108 to promote a hermetic seal between the base 106 and the cover 108.

HDD 100 includes a data storage medium (for example, a magnetic disc) 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated recording head 120 that may carry a read transducer and a write transducer for communication with the surface of the disc. Each head 120 is supported by a head gimbal assembly (HGA) 125. Each HGA 125 illustratively includes a suspension and a HGA circuit. Each HGA circuit provides electrical pathways between a recording head and associated hard disc drive electrical components including preamplifiers, one or more controllers, printed circuit boards, or other components. Each suspension mechanically supports an HGA circuit and a recording head 120, and transfers motion from actuator arm 130 to recording head 120. Each actuator arm 130 is rotated about a shaft by a voice coil motor (VCM) assembly 140. As VCM assembly 140 rotates actuator arm 130, head 120 moves in an arc between a disc inner diameter 145 and a disc outer diameter 150 and may be positioned over a desired track such as 152 to read and/or write data. In an idle mode (e.g., when read-write operations are not being performed), the VCM 140 is actuated to rotate the actuator arm 130, in a radially outward direction relative to the disc 110, such that each head 120 is parked or unloaded onto a ramp support 119 secured to the base 106.

HDD 100 further includes a controller 122, including software, firmware, and/or hardware, used to control operation of the various components of the hermetically sealed device 100. The controller 122 may be included on a printed circuit board 124 that may be located below the base 106. Controller 122 may be electrically coupled to the VCM 140 and the recording head(s) 120 via one or more electrical communication signal transmission lines. The electrical communication signal transmission lines facilitate the transmission of power, commands, and data between the controller 122 and the VCM 140 and the recording head(s) 120. As will be described further below, in some embodiments, the controller 122 carries out drive internal pressure computations based on measurements (e.g., temperature measurements) obtained from the head(s) 120.

As indicated earlier, to promote the efficient and reliable operation of the components within the interior cavity 104 of the hermetically sealed HDD 100, a gas is introduced into the interior cavity 104 to create a gas-enriched atmosphere within the interior cavity 104. In one implementation, the gas is an inert gas with a density lower than air. For example, the gas may be helium. Furthermore, the interior cavity 104 is maintained at a pressure that is different than that of the exterior atmosphere outside of the housing 102. For example, in one implementation, the interior cavity 104 is maintained at a pressure lower than that of the exterior atmosphere.

The housing 102, being hermetically sealed, is designed to prevent leaks of the gas from the housing 102. However, the hermetic seal of the housing 102 may be damaged or become defective to the point where the gas may leak from the housing 102. Leaks in the housing 102 tend to cause an increase in pressure or introduction of heavier air, which may affect the efficiency of the hermetically sealed device 100. Accordingly, determining the pressure within the interior cavity 104, and more specifically changes in the pressure within the interior cavity 104, is desirable to help ensure proper operation of the hermetically sealed device 100.

Figure 2:
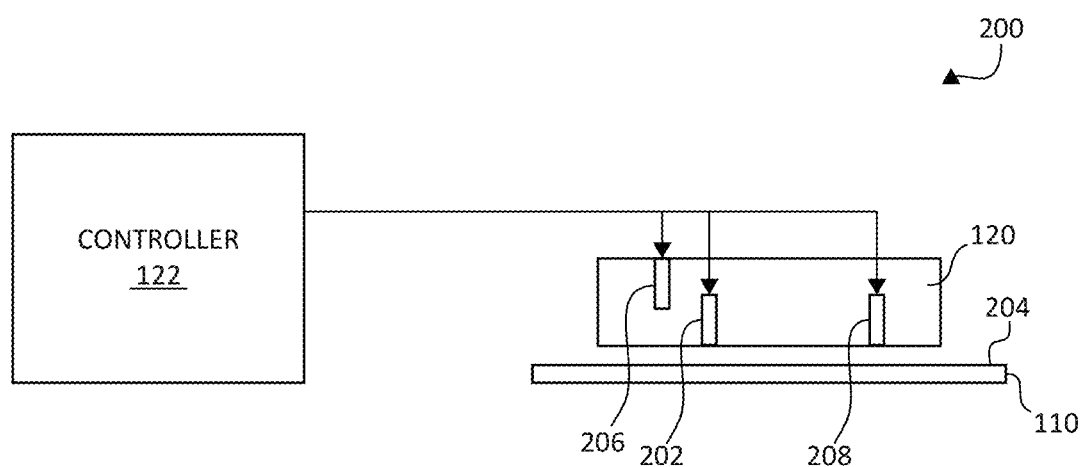
FIG. 2 is a diagrammatic illustration of an example pressure sensing system, which may be included in the data storage drive of FIG. 1.

FIG. 2 is a diagrammatic illustration of an example pressure sensing system 200, which may be included in HDD 100 (of FIG. 1), in accordance with one embodiment. The pressure sensing system 200 includes controller 122 and elements within each recording head 120. In the interest of simplification, only one recording head 120 is shown in FIG. 2. Head 120 may include one or more transducer elements (e.g., reader(s)/writer(s)) 202 to read data from and/or write data to disc surfaces such as surface 204 of disc 110. Head 120 may also include one or more heaters 206 and a temperature sensor (e.g., a DETCR sensor) 208. Controller 122 is communicatively (e.g., electrically) coupled to transducer element(s) 202, and to heater 206 and DETCR sensor 208. DETCR sensor 208 temperature can be raised above ambient temperature by DETCR bias and heater 206 power that may be adjusted by controller 122. Details regarding how pressure sensing system 200 measures HDD internal pressure are provided below in connection with FIGS. 3-5.

Figure 3:
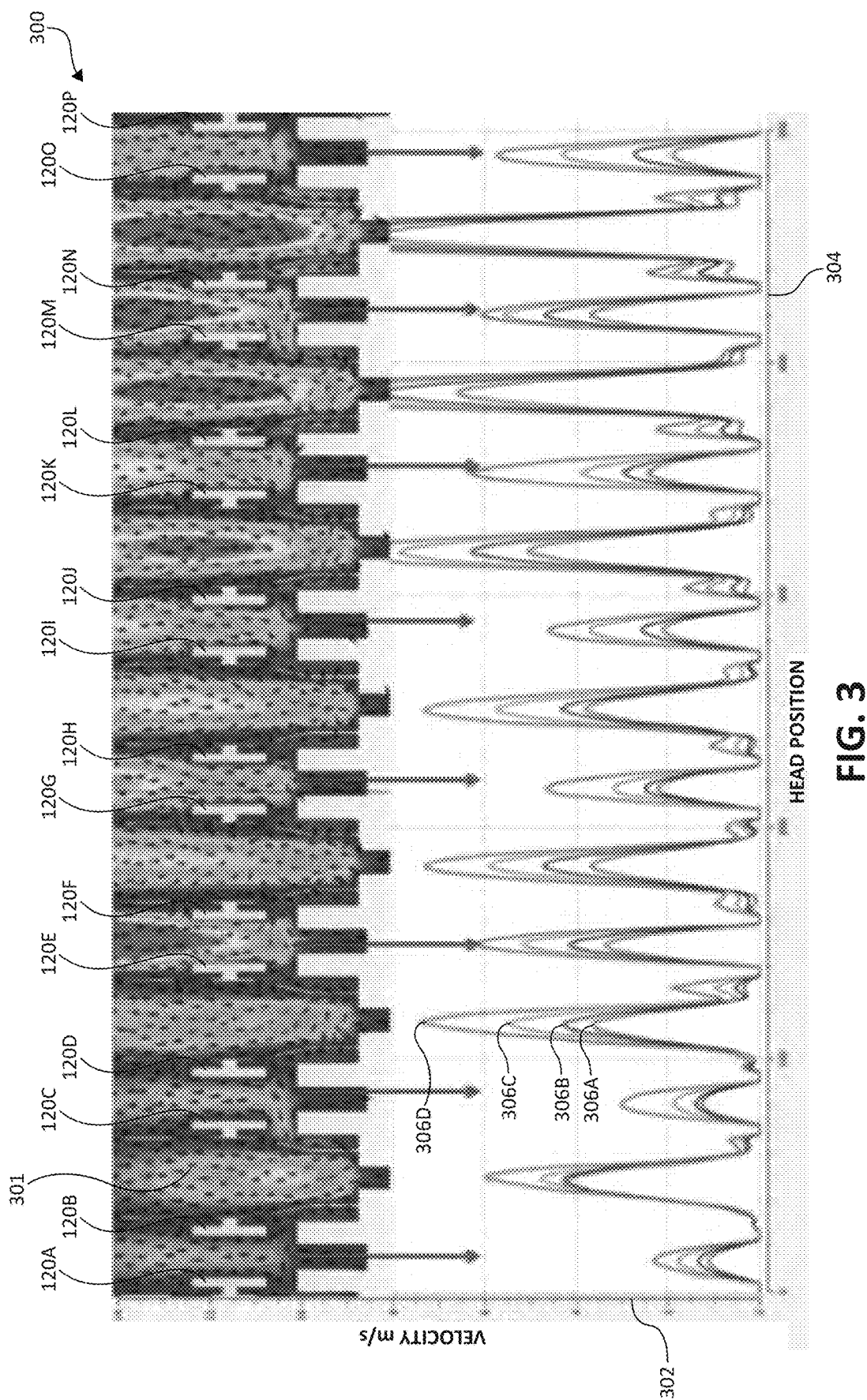
FIG. 3 is a graphical representation of gas flow velocities at head locations under different data storage drive internal pressure conditions when the heads are parked on a ramp and discs are spinning.

FIG. 3 is a graphical representation 300 of gas flow velocities at head locations under different internal pressure conditions when the heads are parked on a ramp (such as 119 of FIG. 1) and discs (such as 110 of FIG. 1) are spinning. The upper portion of FIG. 3 shows heads 120A-120P with air flow 301 occurring between and around the heads 120A-120P when the discs are spinning. Head 120A is a bottom-most head, which is closest to a base of the HDD, and head 120P is a topmost head. In FIG. 3, a vertical axis 302 represents velocity in meters per second (m/s), and a horizontal axis 304 represents a height position in the HDD, with 0 being a base of the HDD. The lower portion of graph 300 shows velocity curves 306A, 306B, 306C and 306D at different locations along the height of the HDD. Curve 306A, which has a lowest velocity amplitude, represents velocity results obtained under a lowest HDD internal pressure of the selected HDD internal pressure conditions, and curve 306D, which has a highest velocity amplitude, represents velocity results obtained under a highest HDD internal pressure of the selected HDD internal pressure conditions. FIG. 3 shows that, when heads are parked on the ramp and discs are spinning, the gas flow velocity at the head location changes with drive internal pressure. This change in gas flow velocity together with the change of pressure affects cooling of the head(s), which can be measured using a temperature sensor (e.g., DETCR sensor 208 of FIG. 2).

Figure 4:
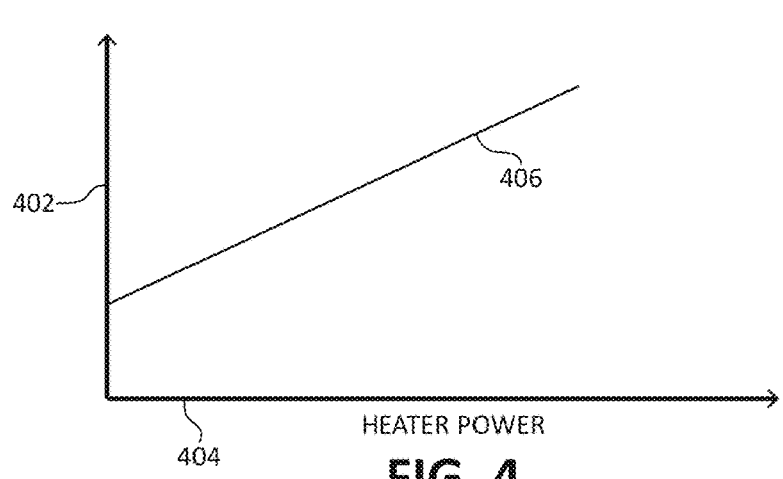
FIG. 4 is a differential ended temperature coefficient of resistance (DETCR) sensor resistance versus heater power graph of measurements obtained when the heads are parked on the ramp and discs are spinning.

FIG. 4 is a DETCR sensor resistance versus heater power graph 400 of measurements obtained when the heads are parked on the ramp and discs are spinning. In FIG. 4, a vertical axis 402 represents DETCR resistance in ohms, and a horizontal axis 404 represents heater power in watts. Measurement procedures include biasing the DETCR sensor in the head with a constant bias current by, for example, a controller (such as controller 122 of FIGS. 1 and 2) to enable measurement of DETCR sensor resistance. DETCR sensor resistance is then measured at multiple heater power values, and a DETCR sensor resistance versus heater power curve 406 is obtained by plotting the DETCR sensor resistance values for the corresponding different heater power values. In a heater power range of interest, the curve 406 in FIG. 4 is a line. The DETCR sensor resistance versus heater power line 406 in FIG. 4 shifts up or down with different drive ambient temperatures. The slope of the line 406, which is a resistance power slope, is invariant to ambient temperature changes. In general, the resistance power slope can be determined by measuring DETCR sensor resistance at different heater power values and fitting a line through the measurements for the slope. As indicated above, this may be carried out by the controller (such as controller 122 of FIGS. 1 and 2) coupled to the heater and the DETCR sensor.

Figure 5:
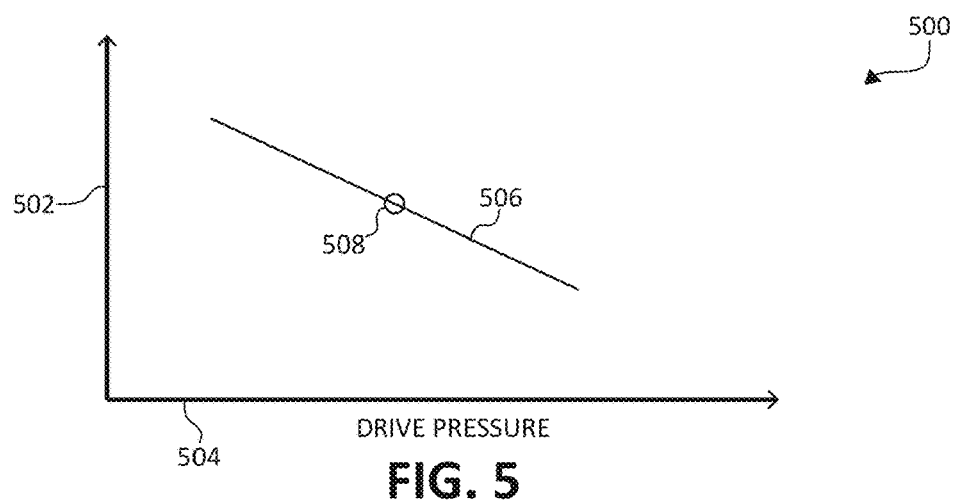
FIG. 5 is a resistance power slope versus drive pressure graph.

When drive pressure changes, the cooling effect at the head(s) will change due to changes in gas flow velocity and pressure. This in turn will change the DETCR sensor resistance power slope. FIG. 5 shows a resistance power slope versus drive (e.g., HDD) pressure graph 500. In FIG. 5, a vertical axis 502 represents the resistance power slope, and a horizontal axis 504 represents drive pressure. A slope of line 506 in FIG. 5 is a resistance power slope versus pressure slope and is referred to as delta resistance (dR) pressure sensitivity. To define the line 506, an interception point or intercept (denoted by 508 in FIG. 5) is also employed. The intercept 508 is defined as the resistance power slope at the drive initial known pressure at manufacturing.

In some embodiments, line 506 of FIG. 5 may be fitted by an external computer outside the drive in a factory or lab. In such embodiments, line 506 is a calibration obtained by measuring a number of drives. The resistance power slope versus pressure line 506 is stored in each drive with three values: dR pressure sensitivity, initial drive pressure, and initial resistance power slope at the initial drive pressure. The three values may be stored in any suitable drive memory (e.g., in a memory within, or communicatively coupled, to controller 122 of FIGS. 1 and 2).

For a particular design of drive (e.g., HDD) and head, dR pressure sensitivity is a global coefficient, meaning that the same value applies to all drives for that design. Global coefficient dR pressure sensitivity may be measured on a small number of drives in the lab at different pressures. Each head will have a measured resistance power slope versus pressure line 506. An average of the slope for all the measured heads is the global dR pressure sensitivity for the particular drive design.

During manufacture of the drive, the initial pressure is known and stored in each drive. At the initial pressure, a resistance power slope is measured on all heads in a drive, and is averaged for the drive. The measured initial resistance power slope is stored in the drive.

Once the drive has global dR pressure sensitivity, initial drive pressure, and initial resistance power slope stored therein, the drive pressure can be measured at any time beyond that point. To measure the current drive pressure, a resistance power slope is measured for all heads when the heads are parked on the ramp, and the discs are spinning. The average of the slope for all the heads is the resistance power slope at current pressure. The current pressure can be calculated by the following equation:

$$\text{Current\_pressure} = \text{Initial\_pressure} + (\text{Current\_resistance\_power\_slope} - \text{Initial\_resistance\_power\_slope})/\text{dR\_pressure\_sensitivity} \qquad \text{Equation 1}$$

Figure 6:
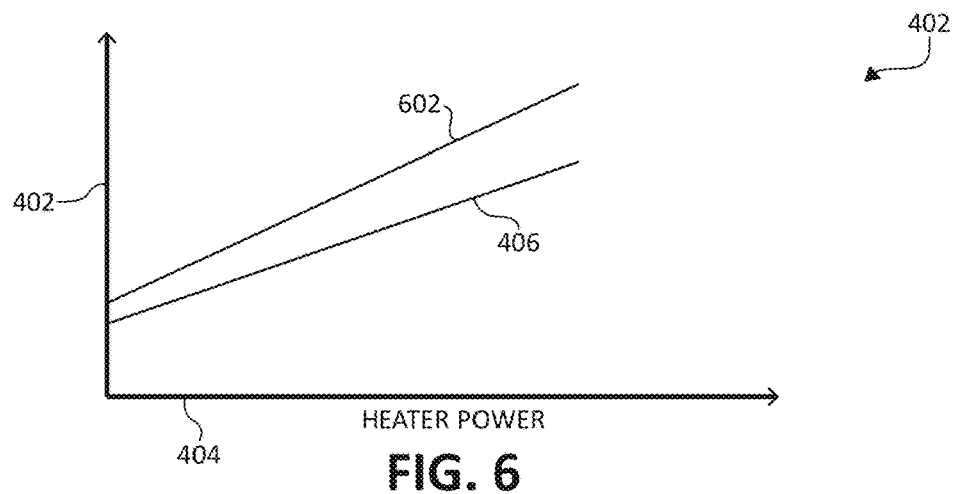
FIG. 6 is a DETCR sensor resistance versus heater power graph of measurements obtained when the heads are parked on the ramp and discs are spinning, and when the heads are stationary.

A variation of the above-described method is to spin the discs down and up when DETCR sensor resistance versus heater power is measured. FIG. 6 is a graph 600, which is similar to graph 400 of FIG. 4, and includes the same axes. To obtain the results plotted in FIG. 6, DETCR sensor resistance versus heater power is measured twice, once with the discs spinning and once with no spin (e.g., with the discs are stationary). Line 602 is a DETCR sensor resistance versus heater power line that represents the DETCR sensor resistance values obtained for different heater power settings when the discs are stationary. Slopes of the two lines 406 and 602 are then calculated, and their difference is as follows:

$$\text{Delta\_resistance\_power\_slope} = \text{resistance\_power\_slope\_noSpin} - \text{resistance\_power\_slope\_spin} \qquad \text{Equation 2}$$

Then, Delta_resistance_power_slope from Equation 2 is used as metric instead of resistance power slope in FIG. 5. The rest of the method is the same as described above in connection with FIG. 5. It should be noted that, in general, the drive internal pressure may be computed in accordance with the embodiments of the disclosure by carrying out suitable measurements when the heads are parked and when the discs are rotating and/or stationary.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and therefore are not drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage drive, comprising:
   a rotatable data storage medium;
   a head communicatively couplable to the data storage medium, the head comprising a temperature sensor and a heater;
   a ramp for supporting the head when the head is moved away from the data storage medium; and
   a controller configured to obtain first temperature sensor measurement values for different head heater power settings when the data storage medium is rotating and the head is positioned on the ramp, and to determine an internal pressure of the data storage drive as a function of the first temperature sensor measurement values.

2. The data storage drive of claim 1 and wherein the temperature sensor comprises a differential ended temperature coefficient of resistance (DETCR) sensor.

3. The data storage drive of claim 1 and further comprising a memory having stored therein initial drive measurement values.

4. The data storage drive of claim 3 and wherein the initial drive measurement values are stored in the memory during manufacture of the data storage drive, and wherein the controller is configured to obtain the first temperature sensor values during field operation of the data storage drive.

5. The data storage drive of claim 3 and wherein the initial drive measurement values comprise a delta resistance pressure sensitivity, an initial drive pressure, and an initial resistance power slope at the initial drive pressure.

6. The data storage drive of claim 3 and wherein the controller is further configured to determine the internal pressure of the data storage drive as a function of the first temperature sensor measurement values and the initial drive measurement values.

7. The data storage drive of claim 1 and wherein the controller is further configured to obtain second temperature sensor measurement values for different head heater power settings when the data storage medium is stationary and the head is positioned on the ramp, and to determine the internal pressure of the data storage drive as a function of the first temperature sensor measurement values and the second temperature sensor measurement values.

8. A method of measuring an internal pressure of a data storage drive, the method comprising:
   positioning a head, which comprises a temperature sensor and a heater and that is communicatively couplable to a data storage medium, on a ramp, wherein the head, the data storage medium and the ramp are part of the data storage drive; and
   obtaining first temperature sensor measurement values for different head heater power settings when the data storage medium is rotating and the head is positioned on the ramp; and
   determining the internal pressure of the data storage drive as a function of the first temperature sensor measurement values.

9. The method of claim 8 and further comprising:
   determining initial drive measurement values; and
   storing the initial drive measurement values in a memory of the data storage drive during manufacture of the data storage drive.

10. The method of claim 9 and wherein the initial drive measurement values comprise a delta resistance pressure sensitivity, an initial drive pressure, and an initial resistance power slope at the initial drive pressure.

11. The method of claim 9 and further comprising determining the internal pressure of the data storage drive as a function of the first temperature sensor measurement values and the initial drive measurement values.

12. The method of claim 8 and further comprising:
   obtaining second temperature sensor measurement values for different head heater power settings when the data storage medium is stationary and the head is positioned on the ramp; and
   determining the internal pressure of the data storage drive as a function of the first temperature sensor measurement values and the second temperature sensor measurement values.

13. A data storage drive, comprising:
   a rotatable data storage medium;
   a head communicatively couplable to the data storage medium, the head comprising a temperature sensor and a heater;
   a ramp for supporting the head when the head is moved away from the data storage medium; and
   a controller configured to obtain first temperature sensor measurement values for different head heater power settings when the head is positioned on the ramp, and to determine an internal pressure of the data storage drive as a function of the first temperature sensor measurement values.

14. The data storage drive of claim 13 and wherein the controller is further configured to obtain first temperature sensor measurement values for the different head heater power settings when the data storage medium is rotating and the head is positioned on the ramp.

15. The data storage drive of claim 14 and wherein the controller is further configured to obtain second temperature sensor measurement values for different head heater power settings when the data storage medium is stationary and the head is positioned on the ramp, and to determine the internal pressure of the data storage drive as a function of the first temperature sensor measurement values and the second temperature sensor measurement values.

16. The data storage drive of claim 13 and wherein the temperature sensor comprises a differential ended temperature coefficient of resistance (DETCR) sensor.

17. The data storage drive of claim 13 and further comprising a memory having stored therein initial drive measurement values.

18. The data storage drive of claim 17 and wherein the initial drive measurement values are stored in the memory during manufacture of the data storage drive, and wherein the controller is configured to obtain the first temperature sensor values during field operation of the data storage drive.

19. The data storage drive of claim 17 and wherein the initial drive measurement values comprise a delta resistance pressure sensitivity, an initial drive pressure, and an initial resistance power slope at the initial drive pressure.

20. The data storage drive of claim 17 and wherein the controller is further configured to determine the internal pressure of the data storage drive as a function of the first temperature sensor measurement values and the initial drive measurement values.

\* \* \* \* \*